United States Patent
Daube et al.

(10) Patent No.: US 6,952,379 B2
(45) Date of Patent: Oct. 4, 2005

(54) SEISMIC METHOD AND APPARATUS FOR GENERATING A SEMBLANCE PANEL AND COMPUTING THE REFLECTOR DIP

(75) Inventors: Francois Daube, Houston, TX (US); Mark Rainbow, Gatwick (GB)

(73) Assignee: WesternGeco, L.L.C., Houston, TX (US)

( * ) Notice: Subject to any disclaimer, the term of this patent is extended or adjusted under 35 U.S.C. 154(b) by 232 days.

(21) Appl. No.: 10/250,849

(22) PCT Filed: Jan. 7, 2002

(86) PCT No.: PCT/GB02/00044

§ 371 (c)(1),
(2), (4) Date: Jul. 1, 2003

(87) PCT Pub. No.: WO02/059648

PCT Pub. Date: Aug. 1, 2002

(65) Prior Publication Data

US 2004/0196739 A1 Oct. 7, 2004

(Under 37 CFR 1.47)

(30) Foreign Application Priority Data

Jan. 5, 2001 (GB) .............................. 0100207

(51) Int. Cl.$^7$ ................................................ G01V 1/30
(52) U.S. Cl. ........................................ 367/53; 367/38
(58) Field of Search .......................... 367/38, 40, 53; 702/10, 18

(56) References Cited

U.S. PATENT DOCUMENTS 5,930,730 A * 7/1999 Marfurt et al. ................ 702/16
6,049,509 A 4/2000 Sonneland et al. ............ 367/49

FOREIGN PATENT DOCUMENTS

| EP | 0866343 A2 | 3/1997 |
|---|---|---|
| EP | 0866343 A3 | 3/1998 |
| WO | WO 99/64896 | 12/1999 |

OTHER PUBLICATIONS

PCT International Search Report, PCT/GB 02/00044, dated Apr. 18, 2002.

Marfurt, Kurt J., "3–D Seismic Attributes using a Semblance–Based Coherency Algorithm" Geophysics, Jul.–Aug. 1998, Soc. Exploration Geophysicists, USA, vol. 63, No. 4, pp. 1150–1165, XP002195379.

* cited by examiner

Primary Examiner—Ian J. Lobo
(74) Attorney, Agent, or Firm—WesternGeco, L.L.C.

(57) ABSTRACT

A method of generating a semblance panel comprises summing two or more gathers of traces. The dip of the reflector is taken into account in the summation process, and this prevents semblance peaks from becoming smeared during the summation process and so allows a greater number of gathers to be used to generate the semblance panel. In an embodiment of the invention the dip is determined from the seismic data. Alternatively, the reflector dip used in the summation process may be obtained from pre-existing data acquired at the survey location, or the reflector dip may be already known. The invention can be applied to seismic data containing events from more than one reflector.

15 Claims, 5 Drawing Sheets

SEISMIC METHOD AND APPARATUS FOR GENERATING A SEMBLANCE PANEL AND COMPUTING THE REFLECTOR DIP

BACKGROUND OF THE INVENTION

1. Field of the Invention

The present invention relates to a method of processing seismic data and, in particular, to a method of producing a semblance panel. It also relates to an apparatus for processing seismic data.

2. Description of the Related Art

Once seismic data has been acquired in a seismic survey, it is processed to obtain information about the geological structure of the earth' interior. In order to process seismic data it is necessary to know, or to estimate, the way in which the velocity of seismic energy varies within the earth (this step is otherwise known as determining the "velocity field"). The accuracy of the information obtained about the earth's interior will depend on the accuracy of the velocity field used in the processing of the seismic data.

The step of determining or estimating the velocity of seismic energy from a seismic trace is generally known as "velocity-picking". In essence this consists of identifying a particular feature in a seismic trace, and assigning a particular path of seismic energy to that feature. The velocity of seismic energy can then be determined from the length of the seismic energy path and the travel time of seismic energy producing that feature.

Velocity-picking is currently carried out manually. It is highly labour intensive and consumes a very significant proportion of the human resources required to process seismic data Many techniques for automatic velocity-picking using a computer have been proposed. The reliability of such automated velocity-picking methods is poor, however, and manual quality checking of the results of automatic velocity-picking is required. This quality checking may well take nearly as long as doing the velocity-picking manually.

Thus, there is a need for a method of velocity picking that is less labour intensive than current methods, but that is more reliable than current automated velocity-picking methods.

Many current methods of velocity-picking use "semblance panels". Semblance panels are in general use in the seismic industry as a means of determining velocity fields for further processing of seismic data.

A semblance panel consists of a contour map that has axes of time and velocity, and the vertical axis (that is, the axis perpendicular to the time-velocity plane) represents the semblance. The objective of velocity-picking is to define a function within the time-velocity space that passes through the highest points of the contour map (whilst satisfying constraints such as continuously increasing time and restrictions on velocity inversions). One current method of automatic velocity-picking relies on an iterative technique that attempts to locate the highest points of the contour map by perturbing a 'seed' function in such a way as to move it up the flanks of the peaks on the map and, in doing so, maximise the integral under the function.

One of the problems with this current approach is that the method can locate a local maximum, effectively finding a foothill of a peak rather than the peak itself. Such "foothills" are often introduced into the contour map by noise in the seismic data. Once an automated velocity-picking method has mis-directed itself towards a foothill, rather than the principal peak, it will remain stuck on the foothill and will not locate the principal peak. The automated velocity-picking method will thus not pick the correct velocity, and hence manual quality checking of the results is required.

One prior art attempt at improving the accuracy of conventional automated time-picking methods is to reduce the noise in the seismic data This reduces the height of the foothills, and so reduces the chance that the automated velocity-picking method will locate a foothill rather than a principal peak. Using data from other points in the immediate vicinity of the analysis point is one way to increase the volume of data and so improve the signal-to-noise ratio. The problem with this approach is that, if the seismic data being processed was obtained from a dipping reflector (that is, from a reflector that is not horizontal), the semblance maxima from adjacent data points do not occur at the same time. This means that smearing of the semblance peaks will occur when data from more than one analysis point is used, and this smearing will offset any increase in accuracy caused by the increased signal-to-noise ratio. As a result this approach has been used infrequently. Moreover, if this method is used it is used to only a very limited extent, in that data from very few adjacent points can be added together before significant smearing of the semblance maxima occurs.

SUMMARY OF THE INVENTION

A first aspect of the present invention provides a method of processing seismic data generated by reflecting seismic energy from a reflector, the method comprising the steps of: selecting the $n^{th}$ gather of traces and at least one other neighbouring gather of traces; and producing a semblance panel associated with the location corresponding to the $n^{th}$ gather from the selected gathers taking into account the dip of the reflector.

In principle, any gather of seismic traces containing coherent energy that is suitable for semblance generation can be used in the method of the invention. Examples of suitable gathers of traces include common mid-point (CMP) gathers, common image point (CIP) gathers or common depth point (CDP) gathers.

The present invention takes account of the dip of the reflector in the locality of the analysis location during the generation of the semblance panel. This prevents, or at least significantly reduces, smearing of the semblance peaks when the data from adjacent gathers are added together to improve the signal-to-noise ratio. This reduction in, or elimination of, smearing enables data from more gathers to be added together (typically, the invention enables data from over 20 adjacent gathers to be summed without significant smearing occurring). This in turn enables the signal-to-noise ratio of the seismic data to be increased, so reducing the likelihood that the automatic velocity-picking algorithm will locate a subsidiary maximum rather than a principal maximum. Thus, the present invention improves the accuracy of existing automatic velocity-picking methods, and so reduces the need for manual checking of the results of the automatic velocity-picking.

The current invention is not only of use in automatic velocity picking but also in manual picking because the semblance peaks are more clearly visible to the human eye.

Another way of understanding the advantages offered by the present invention is as follows. A human velocity picker does not use just a semblance panel, but also makes use of Multi-Velocity Function Stack (MVFS) panels. A set of MVFS panels consists of localised stacked images produced from the gathers at the location at which the velocity analysis is being carried out. The MVFS panels are produced by repeatedly stacking the traces in a gather, using a different velocity function for each stacking process. The range of velocities encompassed by the velocity functions used to generate the MVFS panels should be designed to fully enclose the region of error around the initial velocity function—that is, it should encompass the range of velocities within which the actual velocities are thought to lie. The stack response can thus be assessed for a range of velocity functions. At a stacking velocity function that is close to the actual seismic velocity function, events in the stacked seismic data will appear crisp and well defined. As the stacking velocity function moves away from the true seismic energy velocity function, an event in the stacked data becomes more diffuse, and eventually disappears. A human velocity-picker is able to use MVFS panels in addition to a semblance panel to help them pick the correct velocity.

A prior art automatic velocity-picking method is not able to use MVFS panels, and can use only a semblance panel. The present invention, however, provides a way of incorporating the MVFS information into the semblance panel, so giving a semblance-based automatic velocity-picking method access to it. The present invention does this in a preferred embodiment by identifying events on the MVFS panels using a dip search, and then performs the summation to generate the semblance panel along the determined dip rather than at constant time as in the prior art.

The invention is not limited to the case of seismic data containing reflection events from only a single reflector, and can be applied to seismic data containing reflection events associated with more than one reflector.

The reflector dip at the survey location may be already known from pre-existing data. For example, the dip may be known from earlier seismic surveys carried out at that location, or it may be possible to derive an accurate value of the dip from pre-existing seismic data acquired at the survey location. Alternatively, it may be possible to estimate the dip from other data, such as geological data for example. If the dip is known or can be determined in one of these ways, this knowledge of the dip can be used in the present invention. However, the reflector dip at the survey location will not always be known, so a preferred embodiment of the invention comprises determining the reflector dip from the seismic data A second aspect of the present invention provides an apparatus for processing seismic data generated by reflecting seismic energy from a reflector, the apparatus comprising:

means for selecting the $n^{th}$ gather of traces of received seismic energy and at least one other neighbouring gather of traces; and means for producing a semblance panel associated with a location corresponding to the $n^{th}$ gather from the selected gathers taking into account the dip of the reflector.

In a preferred embodiment the apparatus comprises a programmable data processor.

The invention also provides a storage medium containing a program for the data processor of an apparatus as defined above.

Other preferred features of the present invention are defined in the appended claims.

BRIEF DESCRIPTION OF THE DRAWINGS

A preferred embodiment of the present invention will now be described by way of illustrative example with reference to the accompanying figures in which.

DETAILED DESCRIPTION OF SPECIFIC EMBODIMENTS

The present invention will now be described by way of an example in which a semblance panel is generated from CMP gathers.

Figure 1:
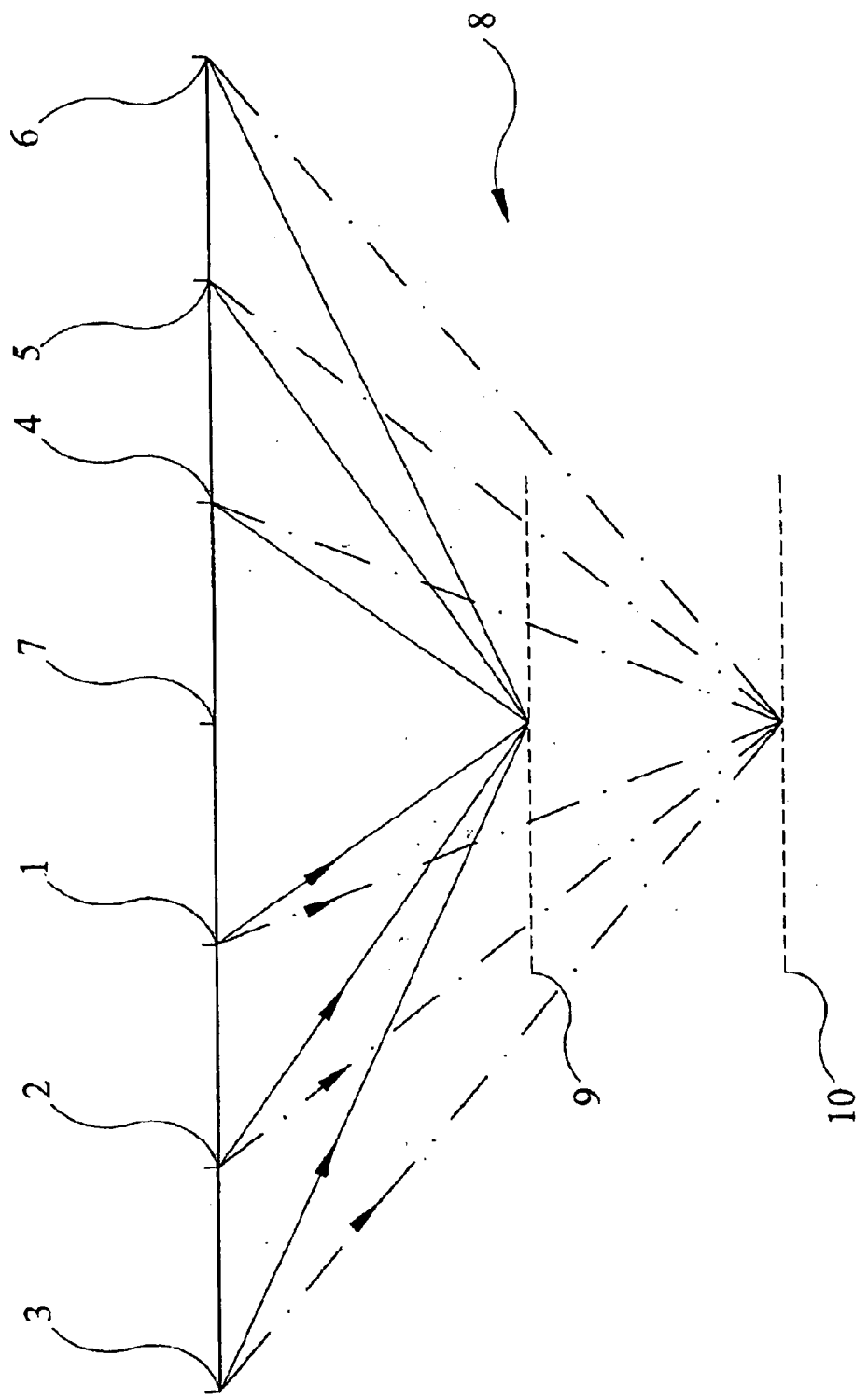
FIG. 1 is a schematic sectional view of a surface seismic survey.

The general principles of a seismic survey are shown in FIG. 1. Seismic data are collected using an array of seismic sources and seismic receivers. In the case of a seismic survey carried out on land, for example, the data may be collected using, for example, explosive charges as seismic sources and geophones as seismic receivers. The arrangement of seismic sources and receivers shown in FIG. 1 is known as a surface seismic survey, since the sources and receivers are all located on the earth's surface.

FIG. 1 schematically illustrates one source and receiver arrangement. First, second and third seismic sources 1, 2 and 3 co-operate respectively with first, second, and third receivers 4, 5 and 6. The sources and receivers are arranged about a mid point 7. For the sake of simplicity, the stratum or rock 8 beneath the sources and receivers will be assumed to be isotropic and to contain first and second horizontal partial reflectors 9 and 10. Seismic energy produced from the actuation of the first source 1 is reflected from the partial reflectors 9, 10 and received by each of the receivers 4, 5 and 6.

For the sake of simplicity, only seismic energy paths involving a reflection that occurs directly beneath the mid point 7 will be considered here. For example, we consider only energy received at the first receiver 4 as a result of actuation of the first source 1 which will have undergone a reflection beneath the mid-point 7, as will energy received at the second receiver 5 as a result of actuation of the second seismic source 2 and energy received at the third receiver 6 as a result of actuation of the third seismic source 3. The point 7 is a Common Mid-Point, or CMP, for all the energy paths shown in FIG. 1.

Other seismic energy paths (not shown in FIG. 1) will not have the point 7 as their mid-point. In a typical seismic surveying arrangement, there will be a large number of possible seismic energy paths, and these paths will have a plurality of associated CMPs.

After the raw seismic data have been acquired, the reflected signals (known as traces) received by each of the receivers as a result of the actuation of a source of seismic energy are processed to produce an image of the earth's interior. During processing of the seismic data obtained in a typical seismic survey, the traces are initially sorted so that traces having the same common mid-point are grouped together. A group of traces sharing a CMP is known as a "CMP gather". This enables the geology beneath the line of sources and receivers to be probed at a number of positions.

Figure 2:
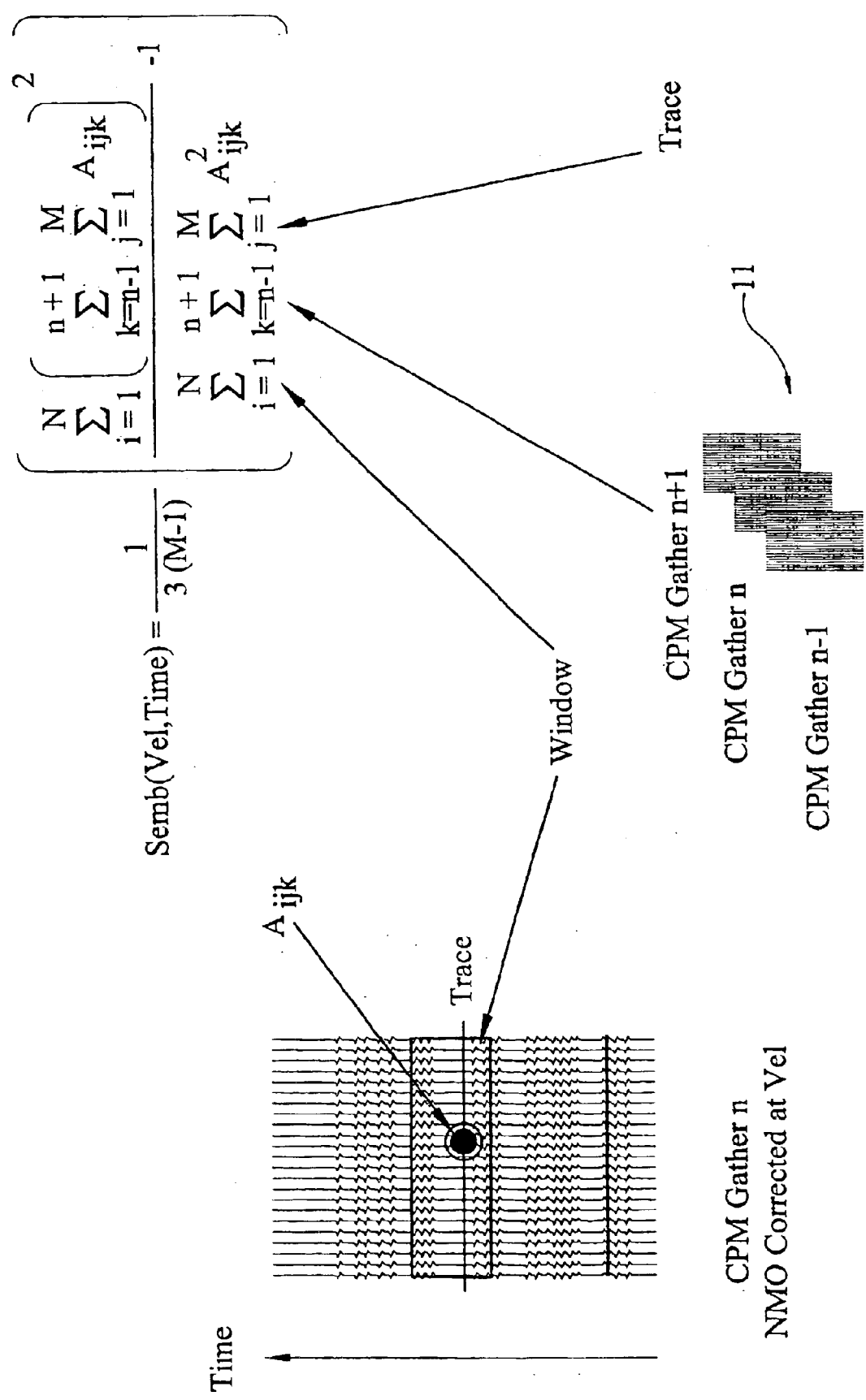
FIG. 2 is a schematic illustration of the generation of a semblance panel according to an embodiment of the present invention.

CMP gathers are shown schematically as 11 in FIG. 2. Three CMP gathers are shown in the right of FIG. 2, and it is assumed that these are the gathers corresponding to the $(n-1)^{th}$, $n^{th}$, and $(n+1)^{th}$ CMPs. Each gather consists of a set of seismic traces that represent the amplitude of seismic energy received at a receiver as a function of time. Every trace in the CMP gather corresponds to one receiver in the receiver array of the seismic surveying arrangement. The traces in the CMP gathers in FIG. 2 are vertical—that is, the vertical axis represents time and the horizontal axis represents the amplitude of seismic energy received at a receiver.

A semblance panel is generated from the CMP gathers 11. In the prior art, the $n^{th}$ semblance panel—that is, the semblance panel for the $n^{th}$ CMP—is normally generated from the $n^{th}$ the CMP gather. In a prior art method where data from adjacent CMP gathers is also used in the generation of the $n^{th}$ semblance panel then, as explained above, additional data can be taken from only a few additional CMP gathers. In a typical prior art example, additional data is taken from the $(n-1)^{th}$ and $(n+1)^{th}$ CMP gathers. In this prior art example, the semblance panel is generated using:

$$Semb(Vel, \text{Time}) = \frac{1}{3(M-1)} \left( \frac{\sum_{i=1}^{N} \left( \sum_{k=n-1}^{n+1} \sum_{j=1}^{M} A_{ijk} \right)^2}{\sum_{i=1}^{N} \sum_{k=n-1}^{n+1} \sum_{j=1}^{M} A_{ijk}^2} - 1 \right) \quad (1)$$

In this equation, $A_{ijk}$ are the individual traces in the CMP gathers. The index j identifies individual traces within a CMP gather, and the summation over j is carried out over the traces in a CMP gather from j=1 to j=M (where there are M traces in each CMP gather 11).

The index k identifies the CMP gather. In this prior art example the $(n-1)^{th}$, $n^{th}$ and $(n+1)^{th}$ CMP gathers are used to generate the $n^{th}$ semblance panel, so the summation over k is carried out from n-1 to n+1. In the prior art method, the summation over k is carried out at constant time, and this is equivalent to assuming that the traces were obtained by reflection from a horizontal reflector—i.e. that the dip of the reflector is zero.

The final summation is over the index i. This represents a summation of samples over a window of time in the seismic data. The seismic signal is continuous in time, but in the process of recording the signal in a digital system it is sampled at a series of discrete times (usually at a regular time interval known as the sampling interval). Thus a seismic trace $A_{ijk}$ is represented as series of numbers that represent the amplitude of the seismic signal at the time of each sample. The samples i=1 to N represent a 'window' of time in each seismic trace.

As noted above, because in the prior art method the summation over the index k is carried out on the assumption that the reflector has zero dip, it is usually possible to include only a few CMP gathers in the summation before the peaks in the semblance panel become smeared. According to the present invention, therefore, the generation of the semblance panel takes account of the dip of the reflector.

In principle, two or more CMP gathers can be used to generate a semblance panel in the method of the invention—the semblance panel for a location corresponding to the $n^{th}$ gather is produced from the $n^{th}$ gather and at least one neighbouring gather. In a preferred embodiment, p adjacent gathers on each side of the $n^{th}$ CMP gather are used. Because the generation of the semblance panels according to the present invention takes account of the dip, a greater number of CMP gathers can be used to generate the semblance panel than in the prior art. It is possible to use many CMP gathers in the generation of the semblance panel, for example by using 10 adjacent gathers on each side of the $n^{th}$ CMP gather.

The dip of the reflector may be estimated from the seismic data, for example by analysing reflection events near the $n^{th}$ CMP location, and the estimated dip may be used in the generation of the semblance panel. Alternatively, if there is pre-existing knowledge about the dip at the survey location, or the dip can be determined from pre-existing seismic data, such pre-existing knowledge can be used in the generation of the semblance panel.

Figure 3:
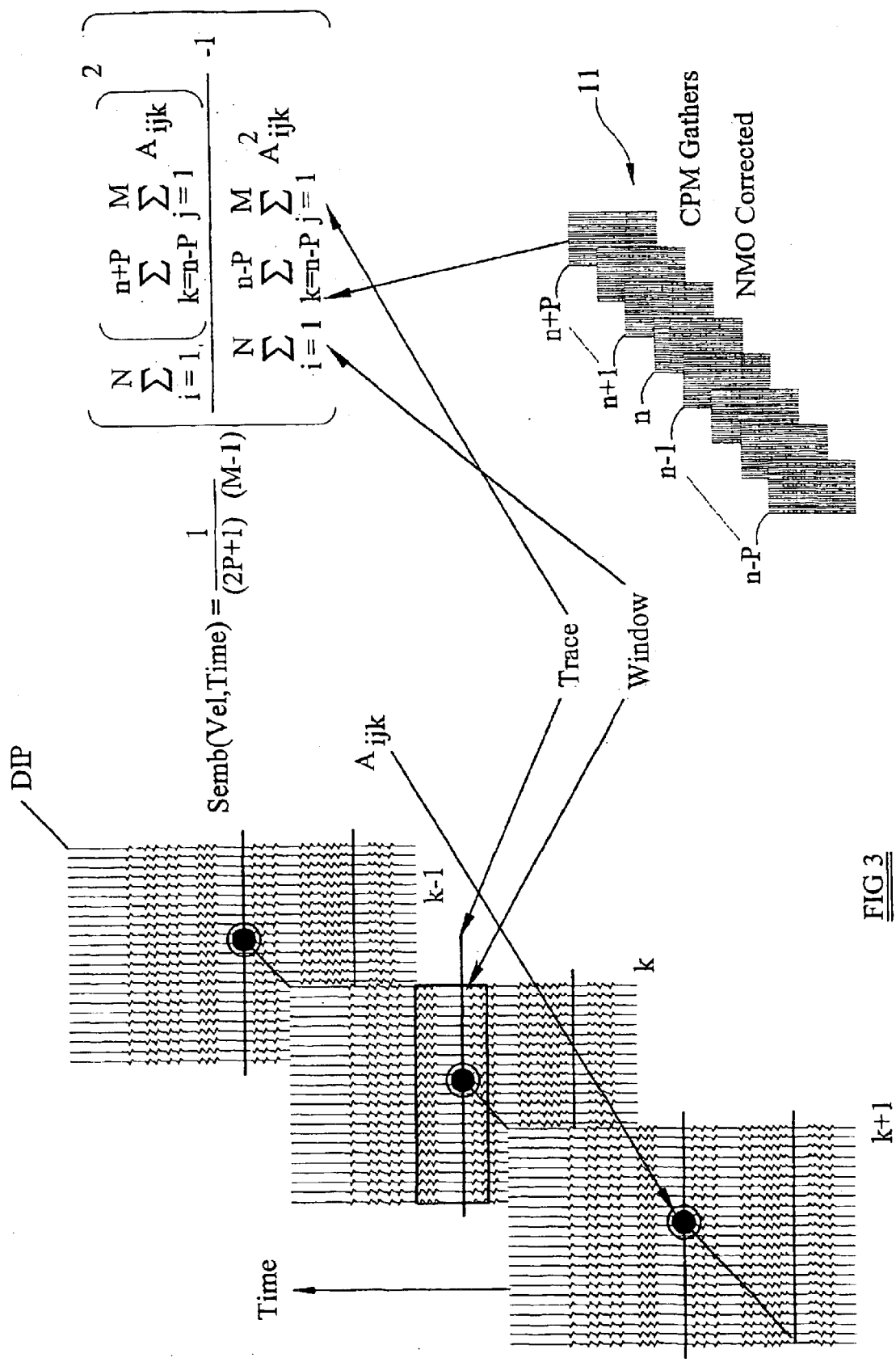
FIG. 3 is a schematic illustration of the generation of a semblance panel according to an embodiment of the present invention.

An embodiment of the invention is schematically illustrated in FIG. 3. Selected CMP gathers 11 are shown in the right of FIG. 3, and it is assumed that these represent the gathers corresponding to the $(n-p)^{th}$, ... $(n-1)^{th}$, $n^{th}$, $(n+1)^{th}$, ... $(n+p)^{th}$ CMPs. If 10 adjacent gathers are selected on each side of the $n^{th}$ gather, then p=10.

The CMP gathers 11 in FIG. 3 are shown after the traces in each gather have been corrected for the varying horizontal difference (generally known as "offset") between the seismic source and the receiver used to obtain that trace. The traces within a CMP gather will have been obtained at different offsets, so that a particular seismic event will occur at different times in different traces. If the step of correcting the raw seismic data to zero offset is carried out correctly, then a particular reflection event should occur at the same time in every corrected trace. The traces of the CMP gathers 11 in FIG. 3 have been corrected for offset using the normal (or hyperbolic) moveout correction (NMO correction) which assumes that the velocity of seismic energy within the earth's interior is constant and isotropic, but the invention is not limited to this particular correction for offset.

The velocity used in the NMO correction can be obtained in any conventional manner. For example, it could be the result of a velocity analysis from a prior stage of processing seismic data in the same survey, or it may be obtained from a velocity analysis of a previous seismic survey carried out at the survey location. Alternatively, the velocity used in the NMO correction could be the best estimate based on any other available geophysical and/or geographical knowledge of the survey area.

According to the invention, the summation over the index k (i.e., the summation over the CMP gathers) is not carried out at constant time. Instead, the summation over k is carried out along the dip of the reflector as determined from an analysis of the traces or as estimated by other methods.

In a preferred embodiment of the invention, the semblance panel is generated using:

$$Semb(Vel, \text{Time}) = \frac{1}{(2P+1)(M-1)} \left( \frac{\sum_{i=1}^{N} \left( \sum_{k=n-P}^{n+P} \sum_{j=1}^{M} A_{ijk} \right)^2}{\sum_{i=1}^{N} \sum_{k=n-P}^{n+P} \sum_{j=1}^{M} A_{ijk}^2} - 1 \right) \quad (2)$$

The summations over j, k and i in equation (2) correspond generally to the summations over j, k and i in equation (1). However, the summation over k in equation (2) is carried out along the dip, whereas the summation over k in the prior art example of equation (1) is carried out at constant time. The present invention thus takes account of dip in the generation of the survey panel.

Since the present invention takes account of dip in the generation of the semblance panel, a larger number of CMP gathers may be included in the summation before smearing of the semblance peaks occurs. The summation over k in equation (2) is carried out from k=(n−p) to k=(n+p), corresponding to summing p adjacent CMP gathers on each side of the $n^{th}$ CMP gather—i.e. a total of 2p+1 gathers. In contrast, the summation over k in the prior art example of equation (1) is carried out from k=(n−1) to k=(n+1). Since 2p+1 CMP gathers are used to generate the semblance panel in equation (2), the normalising factor outside the bracket in equation (2) involves 1/(2p+1). In contrast, the normalising factor in equation (1) involves ⅓, since only 3 CMP gathers are used.

Once the semblance panel for the $n^{th}$ gather has been calculated, it can be operated on by any conventional semblance-based automatic velocity-picking algorithm. Alternatively, it can be used by an operator engaged in manual velocity-picking.

As noted above, in a preferred embodiment of the invention the dip is determined from the seismic data. One example of a method of doing this will now be described with reference to FIG. 4. In this method a set of MVFS panels are generated from the seismic data, and the dip of the reflector is determined from the MVFS panels.

Figure 4:
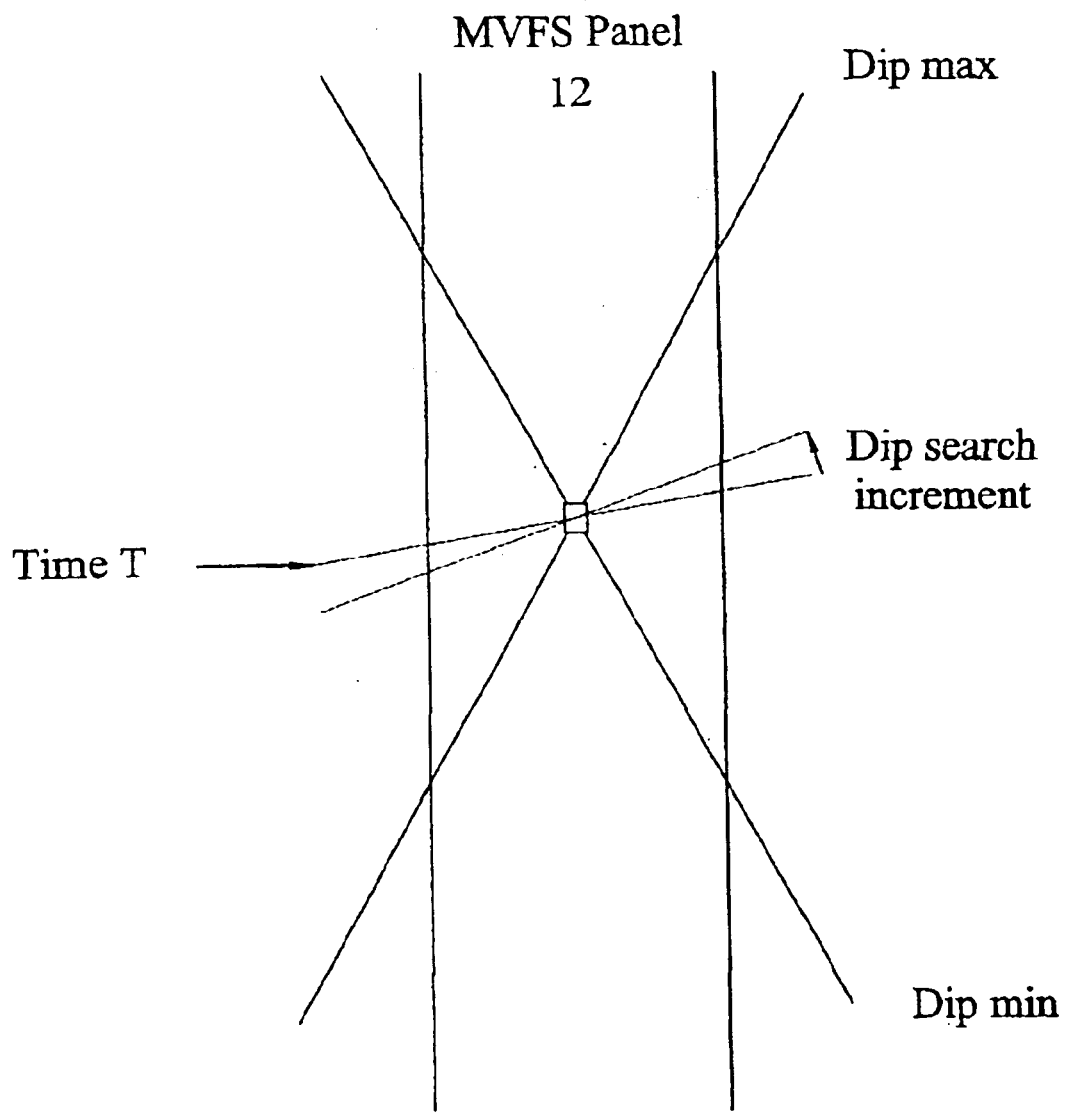
FIG. 4 is a schematic illustration of the determination of dip from an MVFS panel.

The method illustrated in FIG. 4 uses a dip-search algorithm. The objective of the dip-search algorithm is to determine a dip field at each velocity analysis location. A dip field consists of a table of dip values, one dip value for each of the of the MVFS panel sample times. To produce a single dip field, a separate dip field is first produced for each of the MVFS panels. These dip fields are then combined into a single dip field by selecting the most coherent event at each time from all of the panels.

The determination of the dip on particular panel at a particular sample time T—that is, the determination of the dip of the reflector that produces the reflection event at time T in the seismic data—is illustrated in FIG. 4. FIG. 4 shows a single MVFS panel 12 on which the dip search is being performed at time T. The process is repeated for all sample times on all MVFS panels.

The dip search is performed between limits 'Dip max' and 'Dip min'. These represent the upper and lower limits on the likely value of the dip, and may be obtained, for example from pre-existing geological knowledge of the survey location. The semblance of the trace samples along the dip is initially calculated at the lower limit of the dip, 'Dip min'. The dip is then incremented and the semblance re-calculated, and this process is repeated for successive incremented dip values until the upper limit of the dip, 'Dip max' is reached. The dip that produces the highest semblance value is selected as the dip for the time T. The semblance value is also used for the comparison with the coherence of the events identified at the same time on the other MVFS panels in order to select the dip for the overall dip field.

The dip search process requires significant computational effort. In a practical implementation of the method of FIG. 4, therefore, the process described above may not be carried out on all the MVFS panels or at all sample times in the MVFS panels on which the determination is made. It is possible to reduce the computational effort required by choosing a representative selection of MVFS panels and determining the dip field at some sub-sampled time interval. The intervening values of the dip field can then be calculated by interpolation.

In the embodiments described above it has been assumed, for convenience of description, that there is a single reflector although, in practice, seismic data will contain events from more than one reflector. The invention is not limited to use with seismic data containing events from only a single reflector, but can be applied to seismic data containing reflection events from more than one reflector.

The method described with reference to FIG. 4 determines the reflector dip at each sample time. Since events from different reflectors will occur at different sample times, if this method is applied to seismic data containing events from more than one reflector, it will determine the dip of each reflector that produced an event in the seismic data. (If there is no detectable event at a particular sample time, or if there is no detectable dip at a particular sample time, the dip at that sample time is set to zero.) The dip determined for each reflector can then be used in the generation of the semblance panel.

In an embodiment of the invention in which the reflector dip is determined from pre-existing knowledge about the survey location, or from pre-existing data obtained at the survey location, it would be desirable to obtain separate values of the dip of each reflector that gives rise to events in the seismic data.

Figure 5:
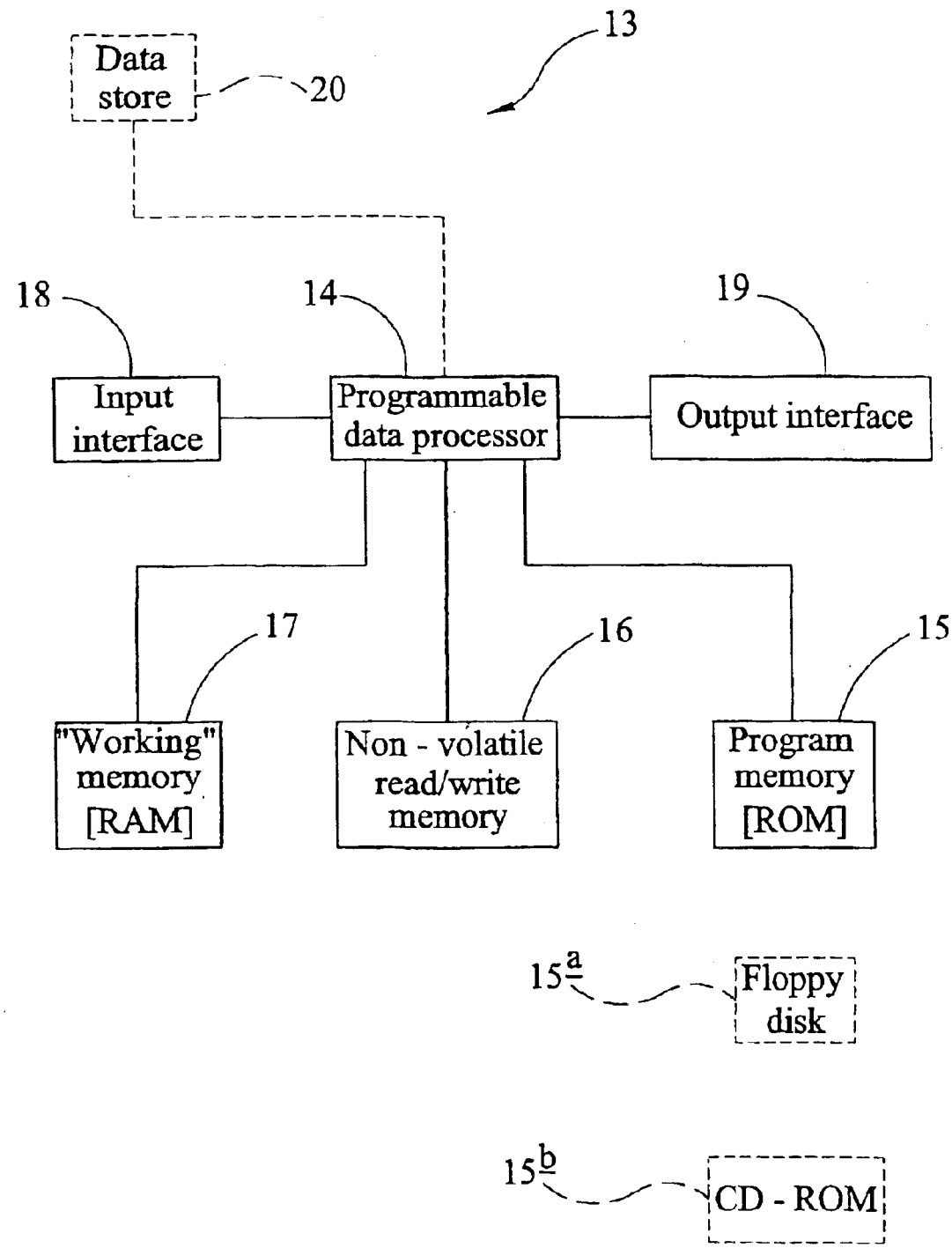
FIG. 5 is a schematic block diagram of an apparatus according to the present invention.

FIG. 5 is a schematic block diagram of a data processing apparatus 13 according to the present invention. The apparatus is able to process gathers of traces of received seismic energy according to a method of the invention so as to obtain a semblance panel.

The apparatus 13 comprises a programmable data processor 14 with a program memory 15, for instance in the form of a read only memory (ROM), storing a program for controlling the data processor 14 to process seismic data traces by a method of the invention. The apparatus further comprises non-volatile read/write memory 26 for storing, for example, any data which must be retained in the absence of a power supply. A "working" or "scratch pad" memory for the data processor is provided by a random access memory RAM 17. An input device 18 is provided, for instance for receiving user commands and data. An output device 19 is provided, for instance, for displaying information relating to the progress and result of the processing. The output device may be, for example, a printer, a visual display unit, or an output memory.

Seismic data for processing may be supplied via the input device 18 or may optionally be provided by a machine-readable store 20.

The program for operating the system and for performing the method described hereinbefore is stored in the program memory 15, which may be embodied as a semiconductor memory, for instance of the well known ROM type. However, the program may well be stored in any other suitable storage medium, such as a magnetic data carrier 15a (such as a "floppy disc") or a CD-ROM 15b.

What is claimed is:

1. A method of processing seismic data generated by reflecting seismic energy from a reflector, the method comprising the steps of:

selecting the $n^{th}$ gather of traces and at least one other neighbouring gather of traces; and producing a semblance panel associated with a location corresponding to the $n^{th}$ gather from the select gathers taking into account the dip of the reflector.

2. A method is claimed in claim 1 wherein the step of producing the semblance panel comprises summing the selected gathers along the dip of the reflector.

3. A method as claimed in claim 1 or 2 wherein the selecting step comprises selecting the $n^{th}$ gather and p (p>1) adjacent gathers on each side of the $n^{th}$ gather.

4. A method as claimed in claim 1, wherein the step of producing the semblance panel comprises the summation:

$$\mathit{Semb}(\mathit{Vel}, \mathrm{Time}) = \frac{1}{(2P+1)(M-1)} \left( \frac{\sum_{i=1}^{N} \left( \sum_{k=n-P}^{n+P} \sum_{j=1}^{M} A_{ijk} \right)^2}{\sum_{i=1}^{N} \sum_{k=n-P}^{n+P} \sum_{j=1}^{M} A_{ijk}^2} - 1 \right)$$

wherein the summation over k in both the numerator and denominator is performed along the dip of the reflector, where $A^{ijk}$ is a trace sample, M is the number of traces in each gather, and N is the number of time samples.

5. A method as claimed in claim 3 where p=10.

6. A method as claimed in claim 1 and comprising the further step of determining the dip of the reflector from the seismic data.

7. A method as claimed in claim 6 wherein the step of determining the dip comprises determining a set of MVFS panels from the selected gathers and determining the dip from the MVFS panel.

8. A method as claimed in claim 1 and comprising the further step of determining the reflector dip from pre-existing data.

9. A method is claimed in claim 1 wherein the gathers of seismic traces are common mid-point gathers.

10. An apparatus for processing seismic data generated by reflecting seismic energy from a reflector, the apparatus comprising:
   means for selecting the $n^{th}$ gather of traces of received seismic energy and at least one other neighbouring gather of traces; and
   means for producing a semblance panel associated with a location corresponding to the $n^{th}$ gather from the selected gathers taking into account the dip of the reflector.

11. An apparatus as claimed in claim 10 and comprising means for summing the selected gathers along the dip of the reflector.

12. An apparatus as claimed in claim 10 or 11 and further comprising means for determining the dip of the reflector from the seismic data.

13. An apparatus as claimed in claim 12 and comprising means for determining a set of MVFS panels from the selected gathers and for determining the dip from the MVFS panels.

14. An apparatus as claimed in claim 10 and comprising a programmable data processor.

15. A storage medium containing a program for the data processor of an apparatus as defined in claim 14.

* * * * *